No. 878,105. PATENTED FEB. 4, 1908.
G. WOLKE.
GOVERNOR AND VALVE MOVEMENT.
APPLICATION FILED JAN. 7, 1907. RENEWED DEC. 26, 1907.
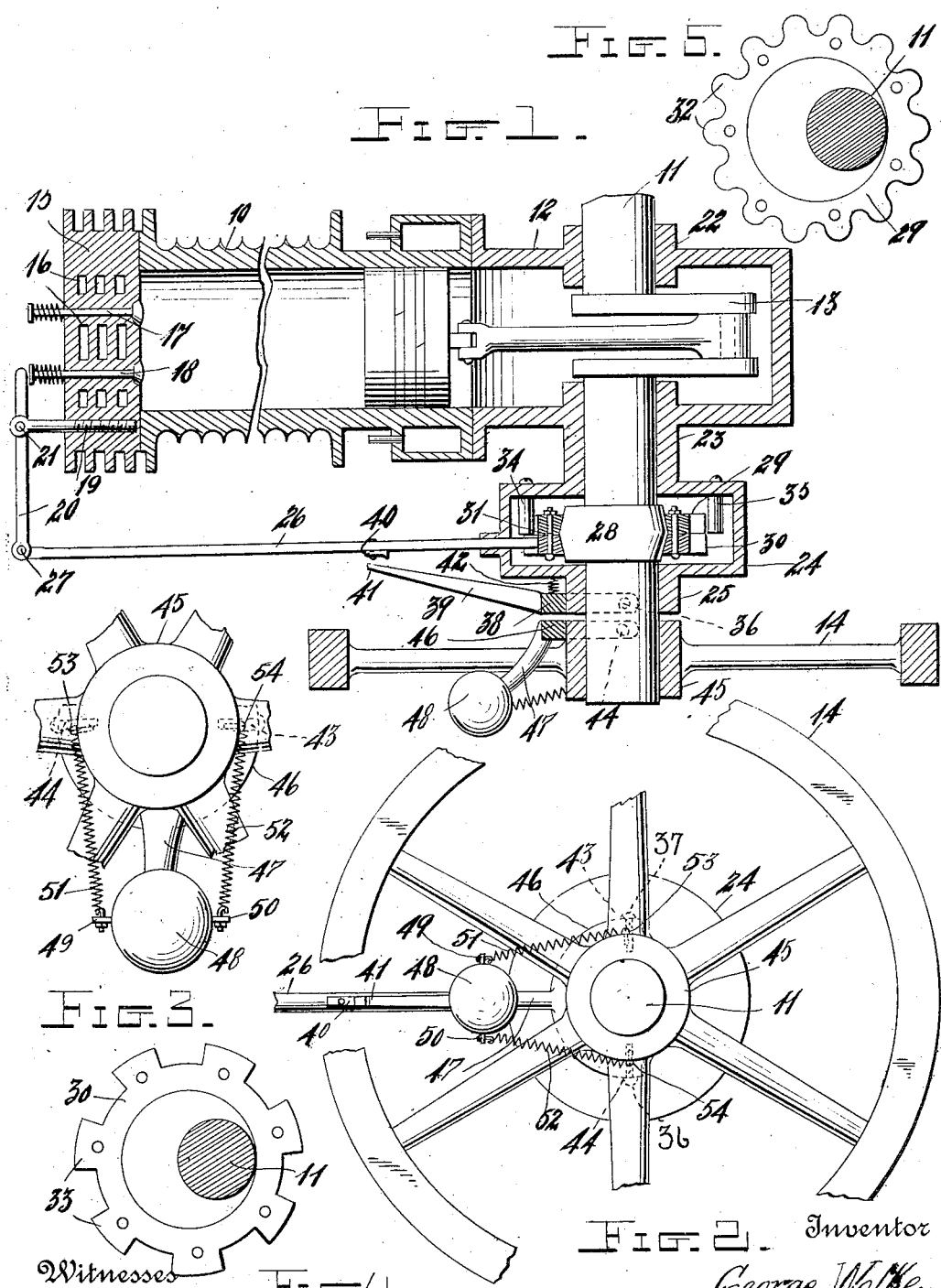

UNITED STATES PATENT OFFICE.

GEORGE WOLKE, OF JACKSONVILLE, ILLINOIS, ASSIGNOR OF ONE-FOURTH TO EDWARD P. KIRBY AND ONE-FOURTH TO WILLIAM K. McLAUGHLIN, OF JACKSONVILLE, ILLINOIS.

GOVERNOR AND VALVE MOVEMENT.

No. 878,105.     Specification of Letters Patent.     Patented Feb. 4, 1908.

Application filed January 7, 1907, Serial No. 351,190. Renewed December 26, 1907. Serial No. 408,268.

*To all whom it may concern:*

Be it known that I, GEORGE WOLKE, a citizen of the United States, residing at Jacksonville, in the county of Morgan and State of Illinois, have invented certain new and useful Improvements in Governor and Valve Movements; and I do declare the following to be a full, clear, and exact description of the invention, such as will enable others skilled in the art to which it appertains to make and use the same.

This invention relates to governors employed upon engines of various kinds, and more particularly to the class of interior combustion or similar motors, and has for its object to improve the construction and increase the efficiency and utility of devices of this character.

With these and other objects in view which will appear as the nature of the invention is better understood, the invention consists of certain novel features of construction, as hereafter shown and described and specifically pointed out in the claims.

In the drawings accompanying this specification and forming a part of the same is illustrated a preferred form of the embodiment of the invention capable of carrying the same into practical operation.

In the drawings thus employed, Figure 1 is a sectional view of portions of a conventional explosive or similar combustion engine, together with the main shaft, fly wheel, and one of the valves. Fig. 2 is a side elevation of the same. Fig. 3 is a detail view in elevation of the hub portion of the fly-wheel and adjacent parts. Fig. 4 is a detail view of one of the toothed, annular, disk-members and showing the drive shaft in section; Fig. 5 is a similar view of the other toothed, annular, disk-member.

In the drawings, the cylinder of the engine is represented at 10, the hood through which the main shaft 11 is journaled is represented at 12, the crank in the shaft at 13, and the fly wheel at 14, all of these parts being of the usual construction. At one end, the cylinder 10 is provided with a head 15 having the usual recesses 16 for the cooling air, and with spaced spring supported inlet and exhaust valves 17—18 of the usual construction, the valves being operative from the exterior of the head, as shown. Extending from the head 15 is a standard 19 in which a lever 20 is pivoted at 21, the shorter end bearing over the valve 18 and adapted to operate the valve when the lever is actuated, as hereafter explained.

A hood 12 is provided with the usual bearings 22—23 for the shaft 11, and extending from the bearing 23 is a casing 24, the casing inclosing the shaft 11 and provided at its outer side with a flange or collar 25, the object of the collar to be hereafter explained. Operating through one side of the casing 24 is a rod 26 pivoted at its outer end at 27 to the lever 20. Formed upon the shaft 11 within the casing 24 is an eccentric 28, having a reversely conical face, as shown. Bearing upon the doubly conical face of the eccentric are two annular disk members 29—30 having reversely conical inner faces corresponding to the conical faces of the eccentric, and bolted together at 31 upon the eccentric. By this simple means, the two annular members are firmly clamped to the eccentric, while the latter is free to rotate within the members, as will be obvious. The disk 29 is provided with spaced teeth 32 upon its periphery, while the disk 30 is provided with teeth 33 upon its periphery, the teeth 33 being one-half in number to the teeth 32, or in other words, the disk 29 is provided with just twice as many teeth as the disk 30. The teeth 32 are semi-circular in outline, while the teeth 33 are formed with flat contiguous edges, and segmental outer faces, as shown respectively in Figs. 5 and 4. Projecting within the casing 24 are spaced rollers 34—35, the rollers being so located that they engage the teeth 32 one at a time at alternate sides as the disks are actuated by the rotation of the eccentric and thus rotate the disks intermittently, as will be obvious. The valve 18 is held normally in closed position by the action of its spring, and thus holds the lever 20 also with its outer end pressed rearwardly and with the inner end of the rod 26 in its inward position and within one of the interstices between the teeth 33, as shown in Fig. 1. When the eccentric 28 is disposed with its shorter side toward the rod 26, the disks 29—30 will occupy a position with the teeth 33 out of contact with the inner end of the rod 26 when the latter is in its normal position, as shown in Fig. 1, and the continued movements of the eccentric co-acting with the rollers 34—35 will rotate the disks the distance of one of the teeth 32 at each half-revolution of the eccentric. By this means, it will be obvious that the teeth 33 of the disk 30 when the disk is in one position will pass the rod 26 without affecting it, the object to be hereafter explained.

Pivoted at 36—37 to the collar 25 is a yoke 38 having an arm 39 extending therefrom, and attached to the rod 26 is a stop 40 with which the free end 41 of the arm 39 engages when the rod is in its projected position. A spring 42 is disposed between the yoke 38 and the casing 24, to hold the yoke and its arm yieldably in normal position with the arm out of engagement with the stop. Pivoted at 43—44 to the hub 45 of the flywheel 14 is a yoke 46 adapted to contact with the yoke 38 for operating the same when the yoke 46 is actuated. Extending at an angle from the yoke 46 is an arm 47 terminating in a relatively large ball 48, the ball having ears 49—50 extending from its sides to support the outer ends of springs 51—52, the inner end of the springs being connected at 53—54 to the hub 45 of the fly wheel, the springs operating to hold the weighted arm 47 and the yoke 46 yieldably in withdrawn position, with the yoke 38 out of action.

With a device thus described, the operation is as follows: The toothed disk 29 having twice as many teeth as the toothed disk 30, causes the latter to push back the rod 26 and operate the valve 18 through the lever 20 at every alternate revolution of the engine, as the inner end of the rod bears on one of the teeth 33 during one revolution and within one of the spaces between the teeth during the next revolution, thus making the requisite "two to one motion", as will be obvious. So long as the engine is running at normal speed, this uniformity of action will be maintained, as the spring 42 holds the yoke 38 and its arm 39 in their outward or in-operative position, while the springs 51—52 likewise hold the yoke 46 and its weighted arm 47—48 in withdrawn or in-operative position. In event of abnormal increase of speed, the weighted lever 47—48 will be drawn inward by the centrifugal force, causing the yoke 46 to bear against the yoke 38 and depress the point 41 of the arm 39 against the rod 26 and cause it to engage the stop 40 at the first outward movement of the rod, and thus hold the valve 18 in open position and reducing the pressure in the cylinder and thereby decreasing the speed until it again reaches normal, when the return of the weighted lever 47—48 to its normal position through the influence of the springs 51—52 will release the yoke 38 and permit its spring 42 to again throw the arm 39 outwardly and release the rod 26.

By this means, it will be obvious that a very simply constructed automatic govenor apparatus is produced which effectually controls the speed of the engine.

While we have shown the improved device applied to an engine having cooling chambers associated therewith, it will be understood that the device is equally applicable to other forms of cylinder or those not having the cooling compartments.

Having thus described the invention, what is claimed is:—

1. An engine having an exhaust valve, an eccentric rotative by the motion of said engine, two annular members coupled together and rotatably mounted upon said eccentric, said members being provided with peripheral teeth, a pair of spaced stop members arranged to alternately engage the teeth of one of the members to intermittently rotate the coupled members, a rod operatively connected with the valve and having one of its ends extended into the teeth of the other annular member, a governor associated with said engine, and means operated by the governor to hold the rod against movement upon an abnormal increase in the speed of the engine.

2. An engine having an exhaust valve, an eccentric rotative by the motion of said engine, two annular members coupled together and rotative upon said eccentric and provided with peripheral teeth with twice as many teeth in one member as in the other, stop members spaced apart and adapted to be alternatey engaged by the annular member which has the greatest number of teeth to intermittently rotate the coupled members, a rod operatively connected to said valve with one end extending into the teeth of the annular member which has the least number of teeth, a governor associated with said engine, and means whereby said rod is held from movement by abnormal increase of speed of the engine.

3. An engine having an exhaust valve, an eccentric rotative by the motion of said engine, a casing upon the engine frame and inclosing said eccentric two annular members coupled together and rotative upon said eccentric and provided with peripheral teeth, with twice as many teeth in one member as in the other, stop members spaced apart within said casing and adapted to be alternately engaged by the annular member which has the greatest number of teeth to intermittently rotate the coupled annular members, a rod operatively connected at one end with said valve and extending into said casing and into the path of the annular member which has the greatest number of teeth, a governor associated with said engine, and means whereby said rod is held for movement by an abnormal increase of the speed of the engine.

4. The combination with an engine including a drive shaft and an exhaust valve in the cylinder thereof, of an eccentric carried by said shaft, two annular members having spaced peripheral teeth and rotatively associated with said eccentric, one of said annular members having twice as many teeth as the other, spaced stops adapted to be alternately engaged by the annular member which has the greatest number of teeth whereby the coupled annular members are intermittently rotated, a rod operatively connected to said exhaust valve and extending into the path of the annular member which has the least number of teeth, whereby said valve will be actuated by the motion of the engine.

5. The combination with an engine including a drive shaft and an exhaust valve in the cylinder thereof, of an eccentric carried by said shaft, two annular members having spaced peripheral teeth and rotatively associated with said eccentric, one of said annular members having twice as many teeth as the other, spaced stops adapted to be alternately engaged by the annular member which has the greatest number of teeth whereby the coupled annular members are intermittently rotated, a rod operatively connected to said exhaust valve and extending into the path of the annular member which has the least number of teeth, whereby said valve will be actuated by the motion of the engine and provided with a lateral stop, a swinging arm yieldably disposed relative to said rod, a weighted member swinging from said arm, means for maintaining said arm yieldably in in-operative position, and means whereby said weighted member is caused to operate said swinging arm and engage the same with said stop rod.

In testimony whereof I have hereunto set my hand in presence of two subscribing witnesses.

GEORGE WOLKE.

Witnesses:
THOMAS V. FINNEY,
NORMAL KUYKENDALL.